(No Model.) 2 Sheets—Sheet 1.
C. SAMPLE.
VEHICLE BRAKE.
No. 521,389. Patented June 12, 1894.
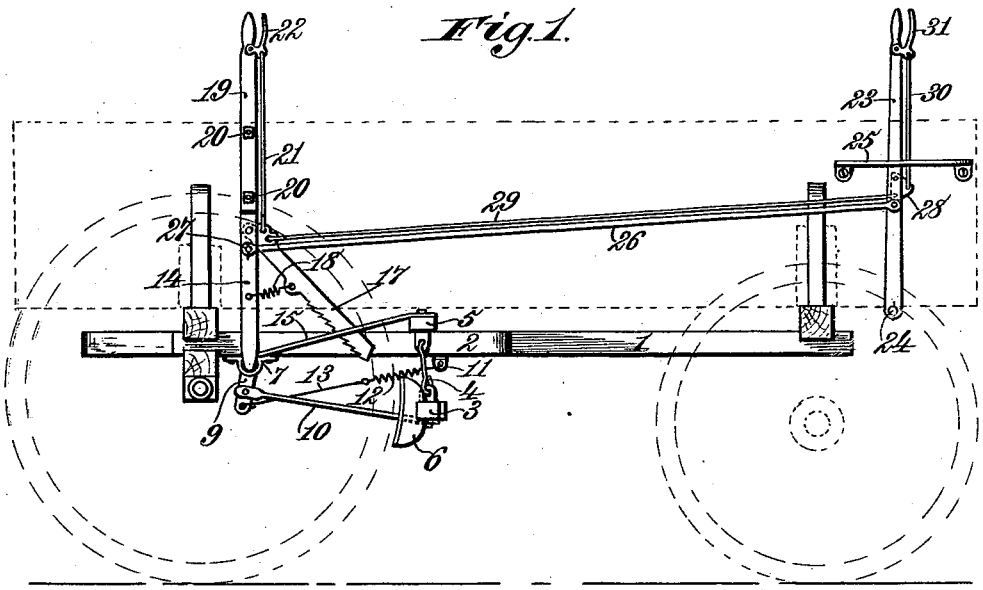
Witnesses.
Robert Everett.
Thos. A. Green
Inventor:
Charles Sample.
By James L. Norris.
Atty.

(No Model.) 2 Sheets—Sheet 2.
C. SAMPLE.
VEHICLE BRAKE.
No. 521,389. Patented June 12, 1894.
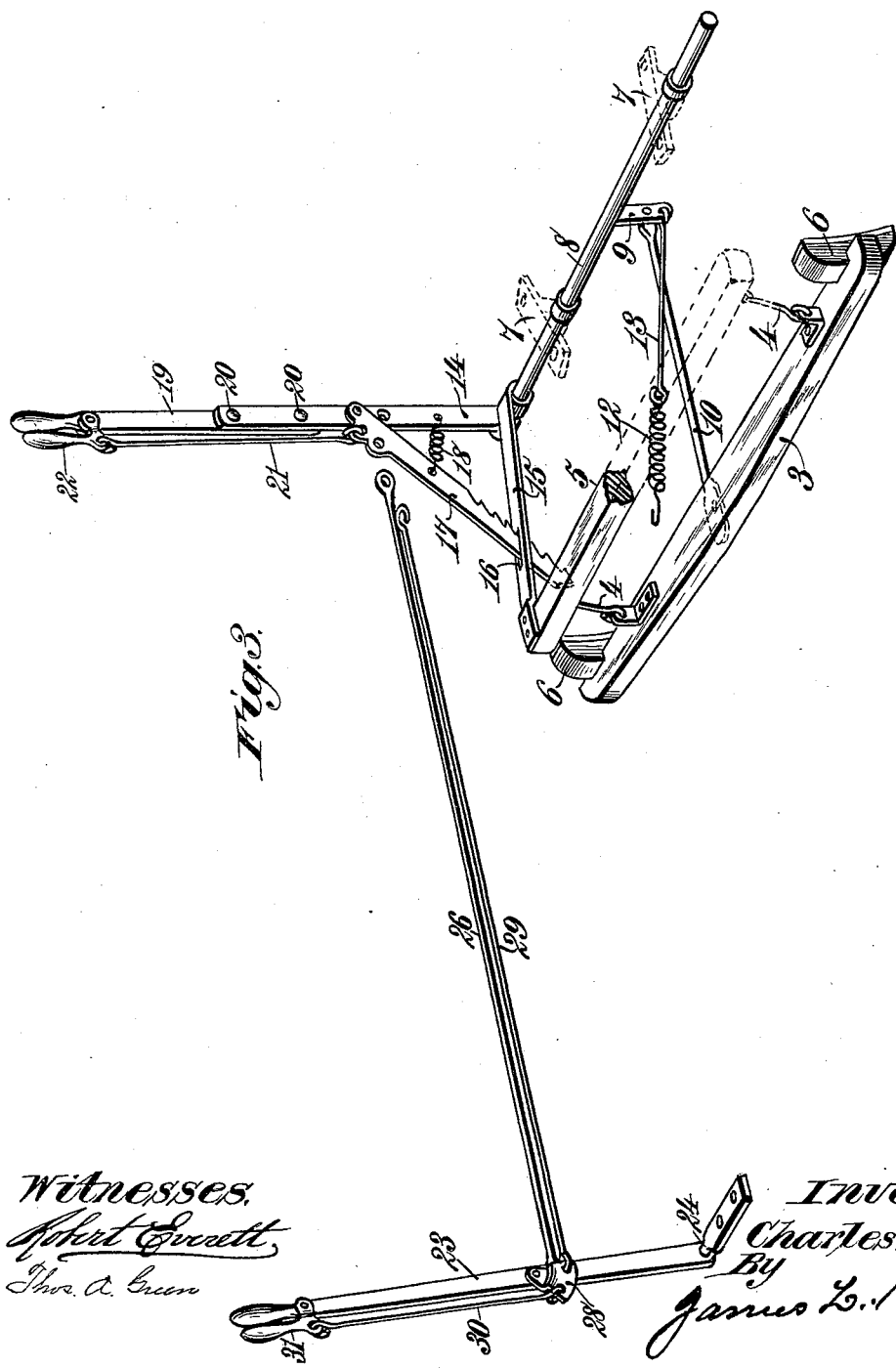

UNITED STATES PATENT OFFICE.

CHARLES SAMPLE, OF VALLEY GROVE, WEST VIRGINIA.

VEHICLE-BRAKE.

SPECIFICATION forming part of Letters Patent No. 521,389, dated June 12, 1894.

Application filed January 27, 1894. Serial No. 498,231. (No model.)

*To all whom it may concern:*

Be it known that I, CHARLES SAMPLE, a citizen of the United States, residing at Valley Grove, in the county of Ohio and State of West Virginia, have invented new and useful Improvements in Vehicle-Brakes, of which the following is a specification.

This invention relates to mechanism for operating brakes for vehicles and especially the brakes on farm-wagons so that the brakes may be controlled either from a seat located on the forward end of the vehicle body or be operated from the rear of a wagon or the top of a load, as when the body and seat are removed for loading the wagon with lumber or other material for which the wagon body is not required.

The object of my invention is to provide a simple, effective, and quickly adjusted brake mechanism comprising locking devices that will hold the brakes firmly and permit an increased closeness and wider range of adjustment than ordinary; a spring that will let off the brakes instantly when the locking devices are released and which is so connected with or supported on the hounds as to offer no obstruction to changing the position of the wagon reach or coupling bar; and an improved system of brake levers and connections for operating the brakes with equal convenience from either end or either side of the vehicle.

My invention consists in the features of construction and novel combinations of parts in a brake mechanism for vehicles, as hereinafter more particularly set forth.

In the annexed drawings illustrating the invention—Figure 1 is a side elevation of my improved brake mechanism applied to the body and running gear of a wheeled vehicle. Fig. 2 is an inverted plan of the same. Fig. 3 is a perspective of the brake mechanism detached.

Referring to the drawings, the numeral 1 designates a wagon reach; 2 the rear hounds and 3 the brake bar suspended by links 4 from a cross bar 5 supported above the forward portion of said hounds. The brake bar 3 carries at its ends the brake shoes 6 that are arranged to be brought into contact with the forward portions of the rear wheels, as usual. The hounds are provided on the under side with bearings 7 to support a rock shaft 8 that is arranged transversely in rear of the brake bar. This rock shaft 8 is provided at or about its center with a depending arm 9 to which is attached the rear end of a connecting rod or bar 10 the forward end of which is secured to the central portion of the brake bar. Attached to one side of the hounds, near the forward end thereof, is a bracket 11 to which is secured the forward end of a spirally coiled spring 12 the rear end of which is connected by a link 13 to the arm 9 of the above mentioned rock shaft. This spring is so arranged that when the brakes are released the tension of the spring, acting through the rock shaft arm 9 and connecting rod 10 of the brake bar, will move the brake shoes quickly away from the vehicle wheels. It will be observed that the spring 12 is not attached to the reach nor to the brake bar and that by its attachment to the hounds it occupies such position that it does not require to be removed or disturbed in making any change in adjustment of the reach or coupling bar.

On one end of the rock shaft 8 is an upward extended lever 14 that need not project above nor quite to the top of the wagon body. A bar 15 has its rear end loosely mounted on the rock shaft 8 at the inner side of this lever 14 and the forward end of said bar is secured to one end of the cross bar 5, as shown. In the bar 15 is a longitudinal slot 16 for passage of a ratchet bar 17 the upper end of which is pivotally connected with the upper portion of the lever 14, preferably on its inner side. The teeth of the ratchet bar 17 are on its rear edge and are formed in such manner as to have a locking engagement with the under side of the rear edge of the slot 16 under the tension of a spring 18 that connects the lever 14 with the ratchet bar 17, at a suitable point above the slotted bar.

In their normal position the brake shoes 6 are held away from the vehicle wheels by the action of the spring 12 drawing forward the rock shaft arm 9 so as to cause it to push on the connecting rod 10 attached to the brake bar. By swinging the lever 14 forward the rock shaft arm 9 will be carried backward so as to draw on the connecting rod 10 and brake bar 3 and thus force the brake shoes 6 in contact with the wheels. In this forward movement of the lever 14 the inclined ratchet bar 17 will move easily downward in the slot 16 of the bar 15 and its teeth will click past the rear edge of said slot without resistance, thus permitting the brakes to be applied easily and quickly. As soon as the lever 14 is brought to rest one of the teeth of the ratchet bar 17 will come into locking engagement with the under side of the rear edge of the slot 16, under the tension of the spring 18 which is capable of exerting sufficient force to hold the brakes firmly in the position to which they may have been adjusted and prevent any accidental displacement.

For the purpose of operating the lever 14 directly from the rear end of the wagon, or from the top of a load of lumber or other material placed on the wagon after the wagon body or box has been removed, it is preferable to provide the said lever 14 with a handle extension or manipulating lever arm 19, detachably secured to the upper end of the lever 14, by means of two bolts 20 that may be easily withdrawn when the said lever extension or handle 19 is not required. When the lever arm or extension 19 is attached, a rod 21 is provided to connect the ratchet bar 17 with the usual small releasing lever 22 pivoted to the upper portion of the lever arm 19 and arranged for disengaging the locking ratchet bar 17 from the slotted locking bar 15 when it is desired to throw off the brakes.

If a wagon body or box is employed a brake lever 23 will be pivotally attached to a stud 24 projecting from one side of the body, near the driver's seat. This lever 23 is preferably arranged to work in a guard or guide 25 to prevent any lateral displacement of the lever. To the lever 23 is attached the forward end of a connecting rod 26 that has its rear end detachably secured to the rear lever 14 by means of a pivotal bolt 27 that can be readily withdrawn when necessary. It will be seen that by means of this connecting rod 26 between the levers 14 and 23 the brakes may be easily operated from the driver's ordinary seat at the forward end of the vehicle. To the inner side of the forward brake lever 23 is pivotally connected one corner of a triangular plate 28 the other corners of which are connected, respectively, with the ratchet bar 17, by means of a rod 29, and, by a rod 30, with a releasing lever 31 on the upper part of the said forward brake lever 23, thus providing means for releasing the brakes from the forward end of the vehicle. It is obvious that the forward and rear brake operating levers may be attached on either side of the vehicle, as preferred.

When a wagon body is to be used the lever arm 19 will, ordinarily, not be needed and it may, therefore be detached by withdrawing the bolts 20 and disconnecting the rod 21 from the ratchet bar. The brakes will then be operated from the lever 23 at the forward end of the vehicle. If it is desired to use the wagon without the body or box and provide means for operating the brakes from the top of the load the bolt 27 will be withdrawn to disconnect the rod 26 from the rear lever 14 and the rod 29 will be disconnected from the ratchet bar 17; all the forward brake operating levers and rods being then removed with the wagon box or body; and the lever arm 19 and its attachments can be then put in position and connected with the lever 14 and ratchet bar 17 to permit easy and convenient operation of the brakes from the top of the load.

What I claim as my invention is—

1. In brake operating mechanism for vehicles, the combination with the brake-bar, a rock-shaft having an arm, a rod connecting said arm and brake-bar, and a spring having one end connected with the rock-shaft arm and its other end secured to a fixed support on the hounds and independent of the reach and brake-bar, of a lever mounted on one end of the rock-shaft, a ratchet-bar having its upper end pivoted to said lever, a fixed slotted bar to engage said ratchet-bar, a spring to hold the ratchet-bar in engagement with the slotted bar to lock the brakes, lever connections mounted on the rock-shaft operating lever for releasing the ratchet-bar, and means for operating the said rock-shaft lever from either or both ends of the vehicle, substantially as described.

2. In brake-operating mechanism for vehicles, the combination with the brake-bar, a rock-shaft having an arm, a rod connecting said arm and brake-bar, and a spring connected with the rock-shaft to let off the brakes, of a lever mounted on one end of the rock-shaft, a detachable extension for said lever, a ratchet-bar pivoted to the rock-shaft lever and working in a fixed slotted bar to lock the brakes, a spring to hold the said ratchet-bar and slotted-bar in engagement, a lever mounted at the forward end of the vehicle and detachably connected with the lever on the rock-shaft, and releasing mechanism through which the ratchet-bar is connected with both levers, substantially as described.

In testimony whereof I have hereunto set my hand and affixed my seal in presence of two subscribing witnesses.

CHARLES SAMPLE. [L. S.]

Witnesses:
THOS. A. GREEN,
G. W. REA.